US010241978B2

(12) United States Patent
Levi et al.

(10) Patent No.: US 10,241,978 B2
(45) Date of Patent: Mar. 26, 2019

(54) MEASURING COMPATIBILITY OF VIEWERS BY LEVERAGING USER-PROVIDED ELEMENT DEFINITIONS

(71) Applicant: Hewlett Packard Enterprise Development LP, Houston, TX (US)

(72) Inventors: Elad Levi, Yehud (IL); Avigad Mizrahi, Yehud (IL); Ran Bar Zik, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/302,861

(22) PCT Filed: Jun. 9, 2014

(86) PCT No.: PCT/US2014/041454
§ 371 (c)(1),
(2) Date: Oct. 7, 2016

(87) PCT Pub. No.: WO2015/191020
PCT Pub. Date: Dec. 17, 2015

(65) Prior Publication Data
US 2017/0031873 A1     Feb. 2, 2017

(51) Int. Cl.
*G06F 17/00*     (2006.01)
*G06F 17/22*     (2006.01)
(Continued)

(52) U.S. Cl.
CPC ........ *G06F 17/2211* (2013.01); *G06F 17/212* (2013.01); *G06F 17/2247* (2013.01);
(Continued)

(58) Field of Classification Search
CPC ..................... G06F 11/26; H04N 2005/4407
See application file for complete search history.

(56) References Cited

U.S. PATENT DOCUMENTS 8,504,991 B2      8/2013  Huang et al.
2003/0204784 A1*  10/2003  Jorapur ............... G06F 11/3684
                                                714/38.14
(Continued)

FOREIGN PATENT DOCUMENTS

CN     103136094        6/2013
EP     2642718 A2       9/2013

OTHER PUBLICATIONS

Choudhary, S.R. et al., Detecting Cross-browser Issues in Web Applications, (Research Paper), May 21-28, 2011, 3 Pages.
(Continued)

*Primary Examiner* — Stephen S Hong
*Assistant Examiner* — Marshon L Robinson (57) ABSTRACT

Example embodiments relate to measuring compatibility of viewers. An example method may include accessing a document object model (DOM) generated by an anchor document viewer in response to rendering document code. The DOM may include multiple DOM elements that correspond to graphical elements displayable by the anchor document viewer. The method may include, for each of at least one of the multiple DOM elements, allowing a user to provide an element definition that indicates how important it is that the corresponding graphical element displays as it does in the anchor document viewer.

14 Claims, 5 Drawing Sheets

(51) Int. Cl.
 G06F 17/21 (2006.01)
 G06F 17/30 (2006.01)
 G06F 3/0482 (2013.01)
(52) U.S. Cl.
 CPC ...... *G06F 17/2252* (2013.01); *G06F 17/2288* (2013.01); *G06F 17/30896* (2013.01); *G06F 17/30905* (2013.01); *G06F 3/0482* (2013.01)

(56) References Cited

U.S. PATENT DOCUMENTS

| | | | |
|---|---|---|---|
| 2005/0028156 A1* | 2/2005 | Hammond | G06F 17/30699 718/100 |
| 2011/0093773 A1* | 4/2011 | Yee | G06F 17/30896 715/235 |
| 2011/0191676 A1 | 8/2011 | Guttman et al. | |
| 2013/0212461 A1 | 8/2013 | Sarangapani et al. | |
| 2014/0052821 A1 | 2/2014 | Prasad | |
| 2014/0075344 A1 | 3/2014 | Bentrup | |

OTHER PUBLICATIONS

Choudhary, S.R. et al., X-PERT: Accurate Identification of Cross-Browser Issues in Web Applications, (Research Paper), Apr. 14, 2013, 19 Pages.

Korean Intellectual Property Office, International Search Report and Written Opinion, Daejeon Metropolitan City, Republic of Korea, Jan. 30, 2015, 11 pages.

Ali Mesbah, et al., "Automated cross-browser compatibility testing", Software Engineering (ICSE), 2011 33rd International Conference on, IEEE, May 21, 2011, pp. 561-570, XP032058255, DOI: 10.1145/1985793.1985870, ISBN: 978-1-4503-0445-0 (Abstract; Section 4).

Jon Michell, "When Developers Can Build Once for All Devices, Users Win", readwrite, posted online on Nov. 3, 2011, 4 pages. <http://readwrite.com/2011/11/03/when_developers_can>.

Shauvik Roy Choudhary, et al., "A cross-browser web application testing tool", 2013 IEEE International Conference on Software Maintenance, Sep. 1, 2010, pp. 1-6, XP055430674, ISSN: 1063-6773, DOI: 10.1109/ICSM.2010.5609728 (Abstract; Section II, Section II-C, Section IV).

w3schools.com, "CSS Selector Reference", retrieved from the Internet on Nov. 14, 2018, 7 pages. <https://www.w3schools.com/cssref/css_selectors.asp>.

WikipediA, "Document Object Model (DOM)", retrieved from the Internet on Nov. 14, 2018, 4 pages. <https://en.wikipedia.org/wiki/Docurnent_Object_Model>.

WikipediA, "Responsive web design", retrieved from the Internet on Nov. 14, 2018, 5 pages. <https://en.wikipedia.org/wiki/Responsive_web_design>.

WikipediA, "Software as a service (SaaS)", retrieved from the Internet on Nov. 14, 2018, 10 pages. <https://en.wikipedia.org/wiki/Software_as_a_service>.

WipipediA, "Cascading Style Sheets", retrieved from the Internet on Nov. 14, 2018, 21 pages. <https://en.wikipedia.org/wiki/Cascading_Style_Sheets>.

Zenmeo.com, "What is Headless browser, the list of headless browser and comparison", ZENMEO Developer Blog, Posted on Jul. 14, 2013, 3 pages. <https://web.archive.org/web/20130826020515/http://www.zenmeo.com/wordpress/what-is-headless-browser-the-list-of-headless-browser/>.

* cited by examiner

MEASURING COMPATIBILITY OF VIEWERS BY LEVERAGING USER-PROVIDED ELEMENT DEFINITIONS

BACKGROUND

With the increase in internet usage, more and more vendors (e.g., companies, non-profit organizations, etc.) are offering web browsers for use by internet users. Furthermore, over time, multiple versions of each of these web browsers may be available and/or in use by various internet users. For example, vendors may create different versions of its web browser for different devices, operating systems and/or platforms.

BRIEF DESCRIPTION OF THE DRAWINGS

The following detailed description references the drawings, wherein.

DETAILED DESCRIPTION

The multiple web browsers and web browser versions described above present a challenge for internet content providers (e.g., webpage developers or application developers). Ideally, a content provider's webpage or application, for example, would display identically on all web browsers and web browser versions. However, this is often not the case. For example, different web browsers may use different rules regarding default presentation of webpage code elements (e.g., HTML elements, CSS elements, image files, etc.). This may result in differences, for example, such as different fonts being displayed, different colors being displayed and/or different margin widths or the like. As another example, different web browsers may differ with respect to their support for various webpage code elements (e.g., JavaScript elements, HTML elements, etc.). This may result in errors on some browsers and not others.

Because of the challenges described above, internet content providers may expend significant time and resources to ensure that their webpages or applications display similarly on different browsers, for example, by creating separate webpage code versions for multiple different browsers and versions. The goal may be to provide a constant look and feel experience for Internet users regardless of how they consume the content (e.g., which browser or version they use). The term "look and feel" may be used with respect to a graphical user interface (GUI) or a GUI element. "Look and feel" may comprise various aspects of design such as colors, shapes, layout, and typefaces (i.e., the "look"), as well as the behavior of dynamic elements such as buttons, boxes, and menus (i.e., the "feel"). Attempting to provide such a constant experience may require significant and continuous testing. In many scenarios, developers manually check their code with several different web browsers and versions, and after detecting a difference in how their content is displayed, they may manually edit their webpage or application code or create multiple versions of their webpage or application code to make sure that there are no differences between different browsers or versions. An ideal goal of this type of testing may be to measure and report the compatibility of the webpage or application with respect to various browsers and/or versions. This type of testing and reporting is time consuming, and due to lack of time, many developers do not test compatibility with all browsers and versions, and hence, several browsers and/or versions may not be supported. Additionally, a human developer, when reviewing how their webpage or application displays on various browsers or versions, may not catch minor differences in how they display. Yet, these differences may be important.

Thus, it would be desirable to have a tool that can automatically analyze how webpage or application code displays on multiple browsers and versions, including identifying the differences and quantifying those differences with a measurable value. Some tools attempt to identify the differences between webpage or application screen shots on various browsers, or, in other words, the manner in which the user interface (UI) displays content to the user on various browsers. However, these tools use image recognition routines and are fairly limited in their ability to detect and report specific details about the differences between the screen shots. Additionally, these tools do not output particular differences and do not output measurable values to quantify the differences to allow a developer or tester to analyze and act on such differences.

The present disclosure describes measuring compatibility of viewers by leveraging user-provided element definitions. According to the present disclosure, particular differences regarding how an anchor viewer (e.g., web browser) and a target viewer display various graphical elements of a document (e.g., webpage or application) may be detected, and the importance of such differences may be determined and reported with measurable values. The present disclosure describes allowing a user (e.g., a tester) to provide element definitions for graphical elements that are displayable by the anchor viewer (and target viewers). Each element definition indicates how important it is (e.g., to the user/tester) that an associated graphical element displays in a particular manner (e.g., with respect to the anchor viewer). The element definitions may be created by a user (e.g., a tester) concurrent with creating a test for the document, for example, as part of a testing stage of an end to end application build and test process. Then, at a later stage of the end to end test process (e.g., a testing stage), a test executor may launch the document in an anchor viewer and a target viewer and execute the test with respect to each viewer. Differences may be determined between how the anchor viewer and the target viewer display various graphical elements of the document. Then, a viewer difference rating may be calculated, which is a quantifiable measurement of how important the differences are, wherein the calculation includes accessing the element definitions provided by the user. Thus, according to the present disclosure, differences regarding how various graphical elements are displayed are detected according to user-provided definitions about which graphical elements are important to display in a similar manner. Reports may be generated for differences associated with multiple target viewers.

Various descriptions herein may refer to webpages, applications, webpage code or application code, for example, to be displayed or viewed by a web browser. However, webpages and applications are just one type of markup document, and the present disclosure contemplates other types of markup documents as well. A webpage, for example, may use a markup language that includes annotations that are distinguishable from the actual content to be displayed (e.g., text, images, etc.). Such annotations may indicate, for example, how the content and/or other elements of the webpage should be formatted and displayed. Similarly, other types of documents may use a markup language. For example, a Microsoft Word document may use annotations to indicate formatting and the like. Additionally, a web browser is just one example of a markup document viewer, and the present disclosure contemplates other types of markup document viewers as well. For example, a Microsoft Word document may be viewed using Microsoft Word or Open Office. Thus, a similar display issue may arise if a content provider wants to ensure that a document displays similarly on these different document viewers. The term "document" may be used in the present disclosure to refer to any type of markup document, where webpages and applications are just some examples. The term "document viewer," or just "viewer," may be used in the present disclosure to refer to any type of markup document viewer, where a web browser is just one example.

Various descriptions herein may describe measuring compatibility of viewers with respect to two types/versions of document viewers (i.e., an anchor document viewer and a target document viewer). It should be understood however, that the various solutions described herein may be expanded to measuring compatibility with respect to more than two types/versions of document viewers (e.g., an anchor document viewer and multiple target document viewers). In such examples, a test executor (e.g., 120 of FIG. 1) may launch more than one target document viewer, and may analyze the DOMs generated by more than one target document viewer. In these examples, the test executor may determine the coverage for multiple target document viewers (as described in more detail below) and may include coverage details for these multiple target document viewers in a single report. However, for clarity and ease of explanation, various descriptions herein may describe only two total document viewers (i.e., an anchor document viewer and a target document viewer), but this should not be construed as limiting and each of these descriptions may be expanded for more than two document viewers.

Figure 1:
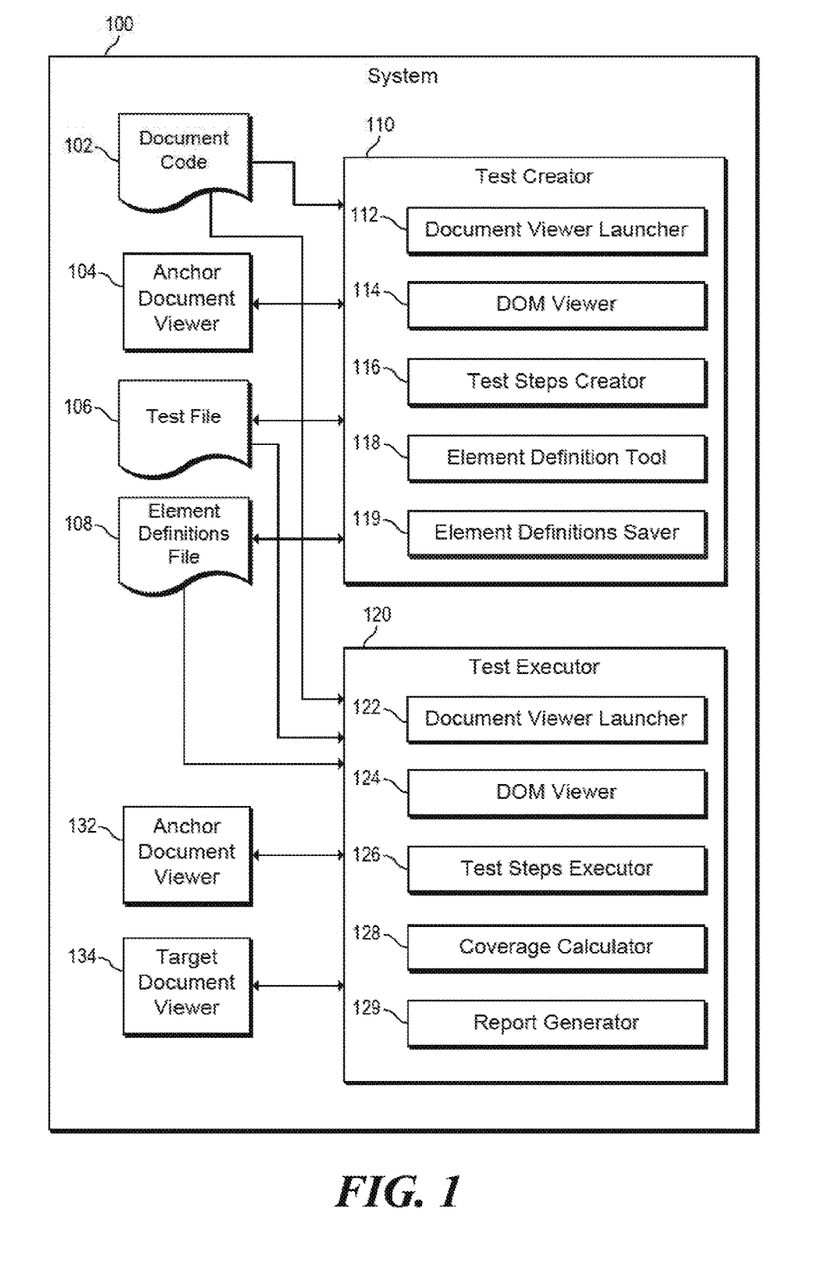
FIG. 1 is a block diagram of an example system for measuring compatibility of viewers by leveraging user-provided element definitions.

FIG. 1 is a block diagram of an example system 100 for measuring compatibility of viewers by leveraging user-provided element definitions. System 100 may include a test creator 110 and a test executor 120. System 100 may be at least one computing device. In some examples, system 100 may be a single computing device, and in other examples, system 100 may include multiple computing devices (e.g., one for test creator 110 and one for test executor 120) that are in communication with each other via at least one network. Such a network may be any wired or wireless network, and may include any number of hubs, routers, switches or the like. Such a network may be, for example, part of the internet, part of an intranet and/or other type of network. Thus, the term "system" may be used to refer to a single computing device or multiple computing devices that communicate with each other.

In the example of FIG. 1, system 100 includes document code 102. Document code 102 may include any number of code files, for example, which use a markup language. For example, document code 102 may include any number of webpage code files or application code files (e.g., files that include HTML, CSS, JavaScript, etc.). Document code 102 may be stored on a machine-readable storage medium and/or a physical storage device of system 100. Various components of system 100 (e.g., test creator 110, anchor document viewer 104, test executor 120, anchor document viewer 132, target document viewer 134) may then access such a machine-readable storage medium and/or a physical storage device to reach document code 102.

System 100 may include anchor document viewer 104. Anchor document viewer 104 is capable of rendering document code (e.g., 102) provided to it (e.g., by test creator 110). Anchor document viewer 104 may cause content such as text and images as well as formatting information to be displayed based on the code (e.g., displaying a webpage, an application page, etc.). Anchor document viewer 104 may be run in a user-centric fashion, which means that the document viewer may run with a graphical user interface (GUI) that actually causes content and formatting to display on a screen to a user. This may allow the user (e.g., tester) to see how the anchor document viewer displays document code while creating tests (e.g., text file 106) and element definitions files (e.g., 108).

Anchor document viewer 104 may be a preferred document viewer, for example, preferred by a developer or tester of document code 102. More specifically, the developer or tester may have created code 102 to display as desired using the anchor document viewer 104. Thus, the manner in which document viewer 104 displays document code 102 may be used as a reference (i.e., an "anchor"). Anchor document viewer 104 may include instructions (e.g., stored on a machine-readable storage medium of system 100) that, when executed (e.g., by a processor of system 100), implement the functionality of the anchor document viewer 104 as described herein. In some examples, anchor document viewer 104 may be Included as part of test creator 110, and in other examples, it may be separate and in communication with test creator 110.

System 100 may Include a test file 106. Test file 106 may include various test steps that are designed to test the functionality of document code 102, for example, the way document code 102 displays in anchor document viewer 104, as well as various background functionalities. Test file 106 may be created to be used as part of an end to end application build and test process. A user may create test file 106 using test creator 110. Test file 106 may then be provided to a test executor (e.g., 120), for example, at a later stage of an end to end test process.

Element definitions file 108 is described in more detail below, including what is in the file and how it is created. But in short, element definitions file 108 includes "definitions" (e.g., user-provided definitions) for various graphical elements that are displayable when document code 102 is executed in anchor document viewer 104. These definitions indicate, according to the user (e.g., tester), how Important it is that various graphical elements display as they do in anchor document viewer 104, and various thresholds or ranges for the display details of these components.

System 100 may include anchor document viewer 132 and target document viewer 134. Anchor document viewer 132 is similar to anchor document viewer 104. Anchor document viewer 132 is capable of rendering document code (e.g., 102) provided to it (e.g., by test executor 120). Anchor document viewer 132 may be the exact same document viewer as anchor document viewer 140 (e.g., in an example where system 100 is a single computing device) or it may be a different installation of the same (replica) type and version of document viewer as anchor document viewer 104 (e.g., in an example where test executor 120 is located on a different computing device from test creator 110). Thus, anchor document viewer 132 is still a preferred document viewer. Target document viewer 134 may be similar to document viewers 104 and 132 in that it is capable of rendering document code (e.g., 102) provided to it (e.g., by test executor 120).

However, target document viewer 134 may be a different type or version of document viewer than anchor document viewer 132 and 104. In one specific example, target document viewer 134 may be a different web browser or different version of a web browser than document viewer 132 or 104. As mentioned above, in some examples, system 100 may include more than one target document viewers.

Anchor document viewer 132 and target document viewer 134 may be run (e.g., by test executor 120) in a "headless" fashion, which means the document viewers run without a visible GUI. Still, display information and DOM information is produced by the document viewers as a result of rendering document code, and this display information and DOM information may be accessible nonetheless. Therefore, it may be determined what an end user would see if they loaded the document code in these viewers.

Test creator 110 may include at least one of a document viewer launcher 112, a DOM viewer 114, a test steps creator 116, an element definition tool 118 and an element definitions saver 119. Test creator 110 (and each of components 112, 114, 116, 118, 119) may include instructions (e.g., stored on a machine-readable storage medium of system 100) that, when executed (e.g., by a processor of system 100), implement the functionality described herein. Alternatively or in addition, test creator 110 (and each of components 112, 114, 116, 118, 119) may include electronic circuitry (i.e., hardware) that implements the functionality described herein.

Document viewer launcher 112 may receive document code 102 and launch an anchor document viewer 104. Document viewer launcher 112 may either provide code 102 to anchor document viewer or it may point anchor document viewer 104 to where code 102 is stored such that anchor document viewer 104 may render the document code. Anchor document viewer 104 may be launched such that a user (e.g., a developer or tester) may see how document code 102 is displayed on anchor document viewer 104 when creating tests (e.g., 106) and/or element definitions files (e.g., 108).

DOM viewer 114 may access and analyze the structure (e.g., tree-like structure) of the document code as rendered by anchor document viewer 104. Such a document code structure may be referred to as a DOM (Document Object Model). DOM may refer to a cross-platform and language-independent convention for representing objects in markup documents (e.g., HTML, XHTML and XML documents). A DOM may be created by the anchor document viewer 104 when it renders document code 102. The DOM may include various code-like elements (e.g., HTML elements, CSS elements, etc.) that relate to various graphical elements that may be displayed to a user when anchor document viewer 104 renders document code 102. Various code-like elements of the DOM (or DOM elements) may include a number of further embedded DOM elements, and so on. As one specific example, a webpage may include a main page frame (a first element) and that main page frame may include a number of section frames (additional elements). Then, each section frame may include a number of buttons (additional elements). DOM viewer 114 may step or "crawl" through the structure of the DOM, for example, as directed by a user (e.g., a developer or tester) that is creating a test. As one specific example, a user may navigate through the rendered document code using anchor document viewer 104, and for each rendered page shown to the user, DOM viewer 114 may also provide the related DOM structure. The user may then be able to select and/or interact with various elements of the DOM. For example, if a rendered page shows a button, the user may see the graphical button via the anchor document viewer 104, and may be able to see and/or select the DOM element that relates to the button.

Test steps creator 116 may allow a user (e.g., a developer or tester) to create a test file (e.g., 106). The user may, for example, create test steps by navigating with the anchor document viewer. As one specific example, a user's actions with respect to the anchor document viewer may be monitored and recorded as testing steps and saved in test file 106, for example, such that these steps may be "replayed" later as a test (e.g., by test executor 120). Test steps creator 116 may also allow the user to view and/or alter various testing steps included in the test file 106.

Element definition tool 118 may allow a user to create various element definitions, as described in more detail below. Element definitions may be closely related to particular test steps, and thus these definitions may be created as part of the test creation process (e.g., concurrently with creating test file 106). For example, as a user (e.g., a tester) creates various test steps (e.g., by navigating with the anchor document viewer), the user may also create various element definitions related to particular graphical elements (e.g., various DOM elements, such as frames. HTML objects or the like). Using element definition tool 118, the user may "mark" (e.g., create an element definition for) particular graphical elements that are important to the user. Then, these marked elements will be analyzed later, during test execution, to compare how they are rendered on different document viewers.

Element definition tool 118 may take various forms. For example, element definition tool may be part of a document viewer "plugin." In this example, element definition tool 118 may be installed as an add-on tool of anchor document viewer 104, and may be run while the user uses anchor document viewer 104 to navigate and create tests. For that matter, any of the other various components of test creator 110 (e.g., components 112, 114, 116, 119) and test creator 110 itself could be part of a document viewer plugin. In other examples, element definition tool 118 may take other forms, for example, a proxy server through which anchor document viewer is launched, or a desktop application via which a user launches anchor document viewer. Again, in these examples, the other various components of test creator 110 (e.g., components 112, 114, 116, 119) and test creator 110 itself could take the same form.

As mentioned above, using element definition tool 118, the user may "mark" (e.g., create an element definitions for) particular graphical elements that are important to the user. For example, a particular header or navigation bar displayed as part of a website may be important to a user. As another example, a particular button displayed as part of a web application may be important to the user. For each element of importance to the user, element definition tool 118 may allow the user to define an "Importance Rating" (also referred to as simply IR). Additionally, for each element of importance to the user, element definition tool 118 may allow the user to define multiple "Differentiator Properties" (also referred to as simply DPs). For a particular graphical element, the IR and multiple DPs may collectively be referred to as an element definition.

The "Importance Rating" (or IR) is a rating (e.g., a numeric rating) that indicates the overall importance of the look and feel of the particular graphical element to the user. For example, a higher value of IR may mean that the element is more important. Higher importance elements may then receive a higher weight when document viewer coverage is calculated (e.g., via component 128), as is described in more detail below. In one particular example, all IR ratings may be a decimal number between 0 and 1, where 0 indicates no importance and 1 indicates critical importance. Decimal number entry is just one example of how the IR may be defined by the user, and various other ways of entering an importance rating (e.g., within a range) may be used, for example, GUI slider bars, GUI selectors, selection of a number between 1 and 10, or various others. In some examples, various graphical elements may have a default IR (e.g., 0, 0.1, 0.2, etc.), and the default may be saved unless the user selects a different IR. The result of an IR of 0 may be that the coverage calculations described below may ignore the particular graphical element. Various other manners of dealing with "undefined" IRs for various graphical elements may be used.

The "Differentiator Properties" (or DPs) are a set of property names and, for each property name, a respective value range and weight. Each property name (and its value range and weight) may define an aspect of graphical look and feel (e.g., location, size, color) that may be important to a user (e.g., a tester) with respect to a particular graphical element. For example, for a "location" property name may have a respective value range that is a distance in terms of pixels. Additionally, each property name and value range pair has a respective weight which indicates how important it is that certain graphical elements adhere to the specified value range. Then, in practice, document code (e.g., 102) may be launched in an anchor document viewer and a target document viewer, as part of a test execution stage (e.g., by 120). Each document viewer may generate a DOM, where various DOM elements have corresponding element definitions (IRs and DPs). Coverage calculator 128 may analyze how various elements of the DOM render in the anchor document viewer and then compare that to how the same or corresponding DOM elements render in the target document viewer. The differences between how the DOMs rendered are then compared to the value ranges of the DPs, and for any matching value ranges, a weight can be determined. The weight for a particular property name and value range indicates how important the particular difference is between how the DOMs rendered.

Figure 2:
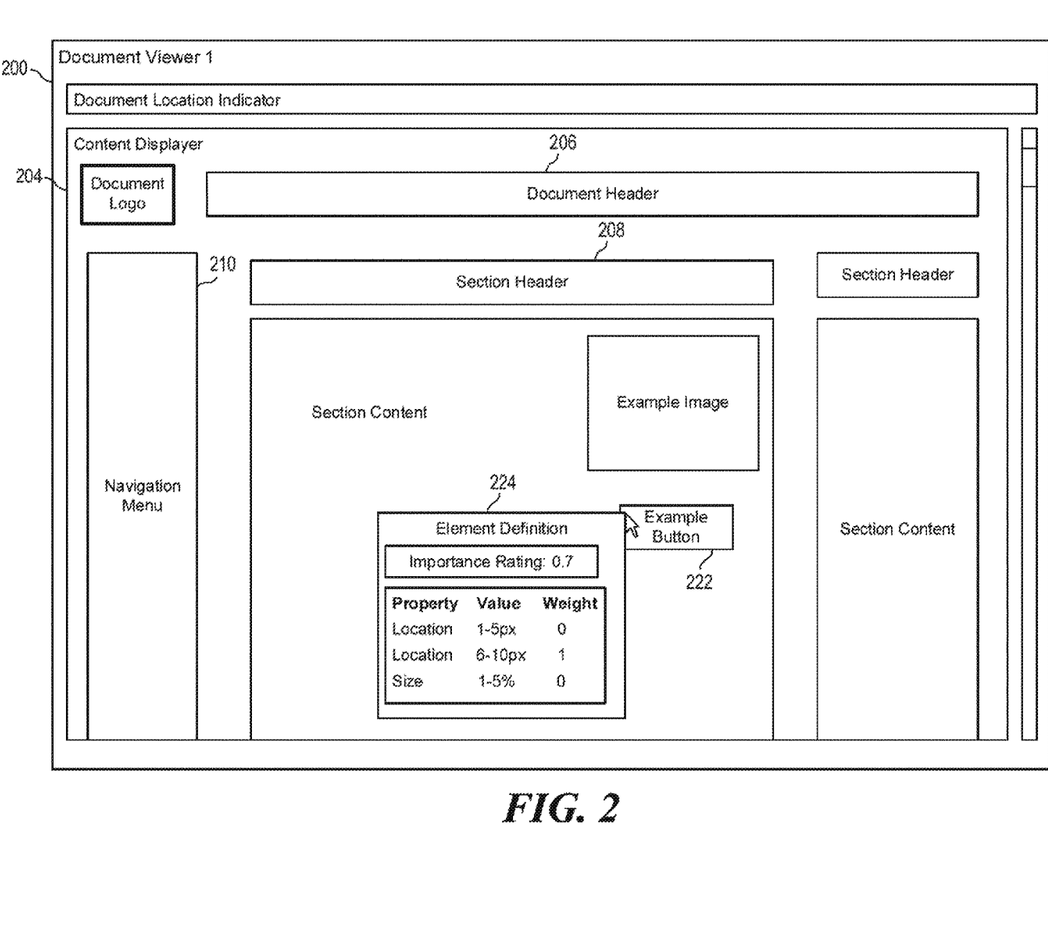
FIG. 2 shows an example document viewer screen, for example, similar to a screen that may be provided by an anchor document viewer.

An example may be used to clarify the above descriptions of the importance rating and differentiator properties. In this example, a particular graphical element is referred to—a button shown on a particular UI page, for example, button 222 on UI page 204. It should be understood that this is just one example, and other examples could be described related to other graphical elements (e.g., header elements, menu elements, text box elements, etc.), and other examples could be described using a different IR and different DPs for this same graphical element.

In this example, it is assumed that the overall look and feel of this button is high (although not critical), and thus the button itself may have an "Importance Rating" (IR) of 0.8. For example, perhaps this button is displayed prominently on this UI page in a main section of this page. And furthermore, perhaps this button links to frequently used and very Important content. Thus, the IR of 0.8 may indicate a high importance for the button element overall.

Continuing with this example, in Table 1 below, DPs are shown for the example button. It can be seen that each entry in the table includes a property name along with a value range and a weight. (The comments in Table 1 are not actually part of each DP and are included for explanation purposes only.) As can be seen in Table 1, multiple table entries can refer to the same property name; however, in some examples, the value ranges for two entries with the same property name should not overlap.

TABLE 1

| Property Name | Value Range | Weight | Comments |
|---|---|---|---|
| Location | 1-5 pixels | 0 | No importance |
| Location | 6-10 pixels | 1 | Critical importance |
| Size | 1-5% | 0 | No importance |
| Size | 6-8% | .5 | Mid-High importance |
| Size | >8% | 1 | Critical importance |
| Color | 1-15% | 0 | No importance |
| Color | 16-28% | .2 | Mid-Low importance |
| Color | >28% | .42 | Mid-High importance |

In the example of Table 1, the property names of "location," "size" and "color" are used; however, other or more property names could be used. Additionally, it should be understood that the descriptions provided herein are just one way to define these properties, and they should not be construed as limiting.

The "location" property type may be measured with reference to a static point on the screen, for example, the top left corner, and it may be measured in terms of distance in pixels (e.g., diagonally or in using an "L" path). The "size" property type may be based on the width and/or height of the element, for example, using a percentage difference. The "color" property type may be based on the amount of darkness and lightness of the element's color, and may use a percentage difference. It should be understood that various other property types may be used, for example, any type of property or setting that can be provided in HTML code or viewed in DOM elements.

Continuing with this example, document code (e.g., 102) may be rendered in an anchor document viewer (e.g., 132) and a target document viewer (134), and then coverage calculator 128 may analyze how various elements of the DOM render differently. The DPs (e.g., from Table 1) may be used then, to determine how important the differences are. Thus, it can be assumed that the example button from above renders at a first location in the anchor document viewer and at a second location in the target document viewer. The coverage calculator 128 may determine the difference between these two locations, for example, by comparing a diagonal pixel length. Then, it can be assumed, for example, that this difference is 3 pixels. With reference to Table 1 above, it can be seen that this 3-pixel difference associates best with the table entry that has the "location" property name with a 1-5 pixel value range. And it can further be seen that the associated weight for this entry is 0. Thus, a difference of 3 pixels is of no importance. However, if the difference had been 9 pixels, then the "location" property with the 6-10 pixel value range would have applied, and based on the associated weight, it can be seen that this would have been a critical difference. Similar comparisons can be made for other differences in how the viewers generate DOMs.

Element definition tool 118 may allow users (e.g., testers) to select or set element definitions (IRs and DPs) in various ways. For example, element definition tool 118 may provide a graphical user Interface (GUI). In one specific example, the GUI may be visible and accessible "on top" of a document viewer (e.g., 104) such that a user can easily select or set IRs and DPs for various graphical elements that the user sees while navigating a document (e.g., webpage, application, etc.) using the document viewer.

FIG. 2 shows an example document viewer screen 200, for example, similar to a screen that may be provided by anchor document viewer 104. In the example of FIG. 2, document viewer screen 200 may display a particular page 204 (e.g., of a webpage, application, etc.). Page 204 may, for example, be one page of various pages that are displayed when a tester navigates through a document using a document viewer. Page 204 may include various graphical elements, for example, a document header (e.g., 206), various sections and section headers (e.g., 208) and various menus (e.g., 210). Continuing on with the example from above, another example graphical element is example button 222. Element definition tool 118 may allow (e.g., via a GUI) a user to set an IR and DPs from example button 222. Element definition tool 118 may allow such IR and DPs settings in various ways. One example way is shown in FIG. 2. In this example, a user may use a pointer to activate (e.g., by right clicking) a menu (e.g., 224) related to the particular graphical element (e.g., example button 222). Menu 224 may allow the user to set an IR for the graphical element, and then select and set details for various DPs, such as location, size, etc. Then, the user may use the pointer to set IRs and DPs for various other graphical elements on the page 204, as well as other pages.

It should be understood that various DPs (including the types/names, the value ranges, and the weights) may be entered or set in various ways. For example, element definition tool 118 may allow a user to search for available property names, and then enter value ranges, and then enter weights. Alternatively, element definition tool 118 may provide a fixed set of options (e.g., with pre-selected property names and value ranges), and the user may only be able to alter the weights. Various other manners of allowing user to set/select IRs and DPs are contemplated.

Referring again to FIG. 1, element definitions saver 119 may save all the element definitions (IRs and DPs) for various graphical elements as set by the user (e.g., tester). Each IR and associated DPs for a particular graphical element may be stored as being associated with a particular graphical element identifier (e.g., element ID, CSS selector, etc.). Then, when DOMs are viewed at a later stage (e.g., by test executor 120), the IR and DPs for a particular graphical element may be recalled using such graphical element identifier.

Element definitions saver 119 may store the element definitions (IRs and DPs) for the various graphical elements in an element definitions file (e.g., 108). The element definitions file may "travel" along with at least one test (e.g., test file 106) to which the element definitions file is related. Thus, for example, at a test execution stage (e.g., in 120), the test may be executed and then DOMs may be compared using the element definitions file. In some examples, IRs and DPs for various graphical elements may be stored in the same file as a test (e.g., as part of test file 106) instead of being a separate file.

Test executor 120 may include at least one of a document viewer launcher 122, a DOM viewer 124, a test steps executor 126, a coverage calculator 128, and a report generator 129. Test executor 120 (and each of components 122, 124, 126, 128, 129) may include instructions (e.g., stored on a machine-readable storage medium of system 100) that, when executed (e.g., by a processor of system 100), implement the functionality described herein. Alternatively or in addition, test executor 120 (and each of components 122, 124, 126, 128, 129) may include electronic circuitry (i.e., hardware) that implements the functionality described herein. In some examples, test executor 120 may be used at a later stage (e.g., in comparison to the test creation stage using test creator 110) of an end to end test process.

Document viewer launcher 122 is similar to document viewer launcher 112 in that it may either provide code 102 to anchor document viewer 132 and target document viewer 134 or it may point these viewers to where code 102 is stored such that these viewers may render the document code. In some examples, such as where system 100 includes multiple computing devices, a copy of document code 102 may be made near test executor 120, and that copy may be used by test executor 120 and/or document viewers 132, 134. Document viewer launcher 122 may launch document viewers 132, 134 in a headless fashion, which means a GUI's of these document viewers may not be visible to users, but visual information and/or DOM information generated by these document viewers may be accessible nonetheless.

DOM viewer 124 may be similar to DOM viewer 114 in that it may access and analyze the structure (e.g., tree-like structure) of the document code as rendered by document viewers 132, 134. Each document viewer (e.g., 132, 134) analyzed by test executor may generate its own DOM or DOM structure, and DOM viewer 124 may be capable of viewing and analyzing each of these DOMs for the various document viewers. Because DOM viewer 124 provides the ability to analyze multiple DOMs associated with multiple document viewers, DOMs (e.g., of two document viewers) maybe compared, for example, as various steps of a test (e.g., 106) are executed.

Test steps executor 126 may run tests (e.g., test file 106) designed to test the functionality of document code 102, for example, as it is rendered by various document viewers (e.g., 132, 134). Test steps executor 126 may, in some examples, "replay" various test steps included in a test file (e.g., 106). Test steps executor 126 may interact with the launched document viewers (132) to run these test steps with regard to multiple document viewers (e.g., concurrently). As the test steps are executed, the DOMs respectively associated with the document viewers (e.g., 132, 134) may be viewed and/or analyzed (e.g., via DOM viewer 124). Various observations, calculations, determinations and/or components of a report may be generated and/or saved as each step of a test is executed. Specifically, at each step of a test, the DOM structures generated by the multiple document viewers (e.g., 132, 134) may be compared.

Coverage calculator 128 may (e.g., concurrent with test execution) access element definitions file 108 and use the element definitions (IRs and DPs) therein to analyze the differences in the DOMs generated by the anchor document viewer 132 and the target document viewer 134. More specifically, in some examples, at various steps of a test, when graphical elements are displayed or changed (e.g., in headless instantiations of the document viewers), coverage calculator 128 may identify corresponding graphical elements in the DOMs created by the document viewers (e.g., by comparing element IDs of graphical elements). Thus, coverage calculator 128 may identify, for any particular DOM element generated by anchor document viewer 132, a corresponding DOM element generated by target document viewer 134. Then, differences between the corresponding DOM elements may be determined, for example, differences with respect to various properties such as position, size, color, or the like. Then, these differences may be compared to any element definition information (IRs and DPs) available for those DOM elements in the element definitions file 108.

Coverage calculator 128 may, at various stages or steps of a test, iterate through certain graphical elements (e.g., visible graphical elements, changed graphical elements, graphical elements with a non-zero IR, etc.), determine differences in corresponding graphical elements (generated by anchor and target document viewers), and then for each graphical element, calculate an "element difference rating" (EDR). An example equation for EDR can be seen in Equation 1 (Eq. 1) below.

$$EDR_j = IR_j \times \Sigma_{i(all\ properties)} Weight_{i(based\ on\ value\ range\ hit)} \quad \text{Eq. 1:}$$

In Eq. 1 above, $EDR_j$ is the element difference rating for element j. $IR_j$ is the importance rating (IR) of element j, as provided by element definitions file 108, for example. Then, $IR_j$ is multiplied against a summation over all the properties (e.g., the properties shown in Table 1 above). At each iteration of the summation, a weight is added related to a particular property (shown as $Weight_i$ in Eq. 1). In some examples, each entry in a properties table (e.g., Table 1) may be a different property (i) in the Eq. 1. In this case, any weights in the table that do not experience a value range hit will be zeroed out in Eq. 1. For example, if a difference in the element's location is 1-5 pixels, then the weight associated with the 1-5 pixel value range will be used in the formula, and 0 will be used as the weight for the other value ranges (e.g., the weight for the 6-10 pixels value range will be overwritten to 0 for the formula). In other examples, each unique property name (e.g., location) is a different property (i) in the Eq. 1. In this case, the weight used in the formula is chosen to be the one associated with the matching value range.

Coverage calculator 128, once it has calculated an "element difference rating" (EDR) for each graphical element, may then calculate a "viewer difference rating" (VDR) for the target document viewer (e.g., 134). The VDR indicates, for a particular target document viewer, a measurable value regarding, overall, how different the target document viewer renders the document code compared to the anchor document viewer. An example equation for VDR can be seen in Equation 2 (Eq. 2) below.

$$VDR = \Sigma_{j(all\ graphical\ elements)} \quad \text{Eq. 2:}$$

In Eq. 2 above, VDR is the viewer difference rating for a particular target document viewer (e.g., 134). It should be understood that this calculation could be performed for any number of target document viewers. In some examples, tests (e.g., 106) may be run against multiple target document viewers concurrently (with multiple DOMs being generated). Then, multiple DOM comparisons may be performed and multiple VDR calculations may be performed. In Eq. 2 above, VDR is equal to a summation over all the graphical elements. This may be all the graphical elements encountered during a particular test for a particular target document viewer, for example. At each iteration of the summation, $EDR_j$ for the particular graphical element (j) is added.

The viewer difference rating (VDR) is a measurable value that provides a quantifiable measurement of how similar a target document viewer is to an anchor document viewer (with respect to how they render document code). This measurable value may be used by various users (e.g., R&D managers) to specifically act on such a value. For example, a user could set target BDRs to reach and could prioritize issues to handle based on BDRs. Various other uses of this measurable value are contemplated.

Report generator 129 may generate a report for at least one target document viewer that provides details about how the target document viewer(s) compares to the anchor document viewer (with respect to rendering the document code). In some examples, report generator 129 may provide details about multiple target document viewers concurrently. For example, test steps executor 126 may run tests against multiple target document viewers and coverage calculator may calculate a BDR for each target document viewer. Then, the details of these calculations for all the target document viewers may be provided in a single report (e.g., a matrix style or table style report). In one specific example, the target document viewers may be sorted in the report according to their BDR. For example, document viewers with higher BDRs may be listed closer to the top of the list, e.g., to identify target browsers with potentially larger issues.

Report generator 129 may provide a GUI to view the report, and thereby, the report may have various sections and parts with which a user may interact to view certain Information. For example, report generator 129 may show a base level report with the various target document viewers and their respective BDRs listed. Then, a user may be able to click on a particular BDR, for example, to drill down or expand and see how the BDR was calculated, for example, which properties were considered, which value ranges were hit, and weightings that were assigned to the various value ranges. Report generator 129 may provide various other GUI functionalities to view information of the report.

Figure 3:
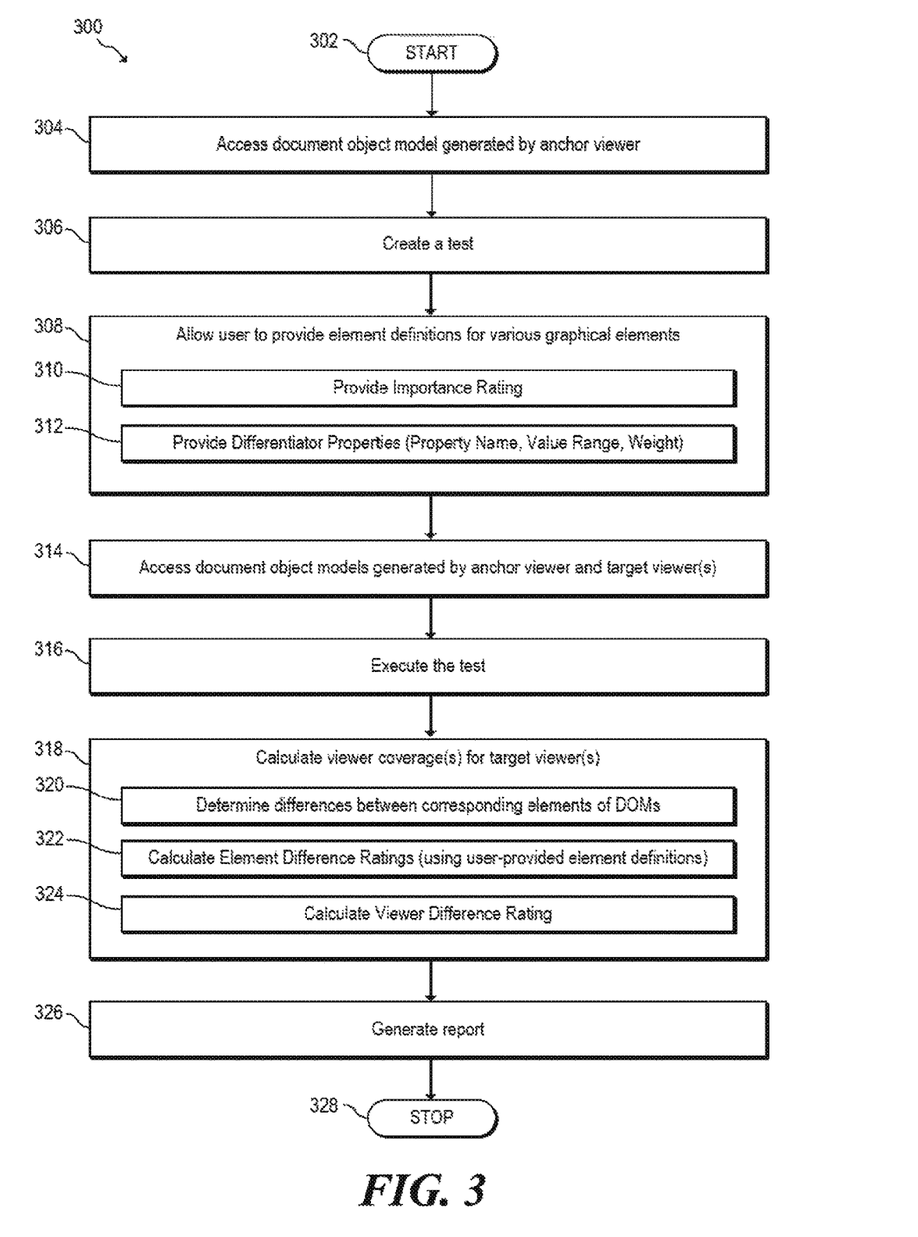
FIG. 3 is a flowchart of an example method for measuring compatibility of viewers by leveraging user-provided element definitions.

FIG. 3 is a flowchart of an example method 300 for measuring compatibility of viewers by leveraging user-provided element definitions. Method 300 may be described below as being executed or performed by a system, for example, system 100 of FIG. 1. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where a system (e.g., system 100 of FIG. 1) may access (e.g., via DOM viewer 114) a document object model (DOM) generated by an anchor document viewer (e.g., 104) as a result of the document viewer rendering document code (e.g., 102). At step 306, the system may create (e.g., via test steps creator 116) a test (e.g., 106), for example, as part of an end to end testing process, as described in more detail above. At step 308, the system may allow a user to provide (e.g., via element definition tool 118) element definitions (e.g., stored in element definitions file 108) for various graphical elements, as described in more detail above. As part of step 308, the system may allow the user, for each graphical element of interest to the user, to provide an importance rating (step 310) and differentiator properties (e.g., each with a property name, a value range and a weight), as described in more detail above.

At step 314, the system may access (e.g., via DOM viewer 124) document object models (DOMs) generated by an anchor document viewer (e.g., 132) and at least one target document viewer (e.g., 134) as a result of the document viewers rendering document code (e.g., 102). At step 316, the system may execute (e.g., via test steps executor 126) the test, for example, as part of an end to end testing process. At step 318, the system may calculate (e.g., via coverage calculator 128) viewer coverage(s) for the target document viewer(s). As part of step 318, for each target document viewer, the system may determine (step 320) the differences between the DOM generated by the particular target document viewer and the DOM generated by the anchor document viewer. Also as part of step 318, for each target document viewer, and for each DOM element of interest to the user, the system may calculate (step 322) an element difference rating (using user-provided element definitions), as described in more detail above. Also as part of step 318, for each target document viewer, the system may calculate (step 324) a viewer difference rating. At step 326, the system may generate (e.g., via report generator 129) a report, as described in more detail above. Method 300 may eventually continue to step 328, where method 300 may stop.

Figure 4:
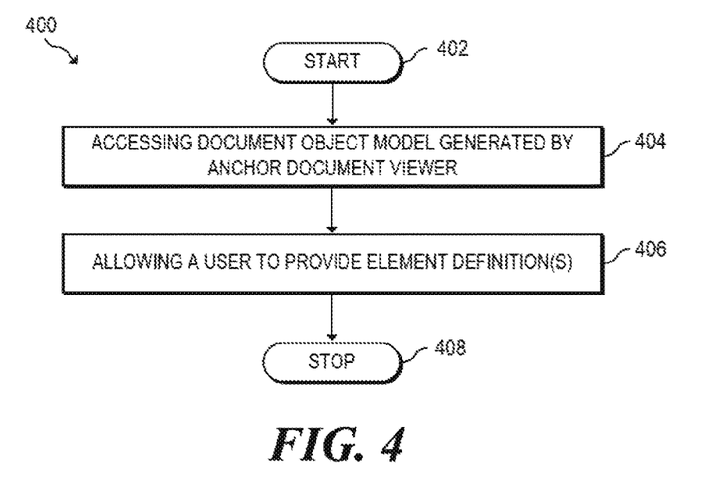
FIG. 4 is a flowchart of an example method for measuring compatibility of viewers by leveraging user-provided element definitions.

FIG. 4 is a flowchart of an example method 400 for measuring compatibility of viewers by leveraging user-provided element definitions. Method 400 may be described below as being executed or performed by a system, for example, system 500 of FIG. 5; system 600 of FIG. 6 or system 100 of FIG. 1. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where the system may access a document object model (DOM) generated by an anchor document viewer in response to rendering document code. The DOM includes multiple DOM elements that correspond to graphical elements displayable by the anchor document viewer. At step 406, the system may, for each of at least one of the multiple DOM elements, allow a user to provide an element definition. The element definition indicates how important it is that the corresponding graphical element displays as it does in the anchor document viewer. Method 400 may eventually continue to step 408, where method 400 may stop.

Figure 5:
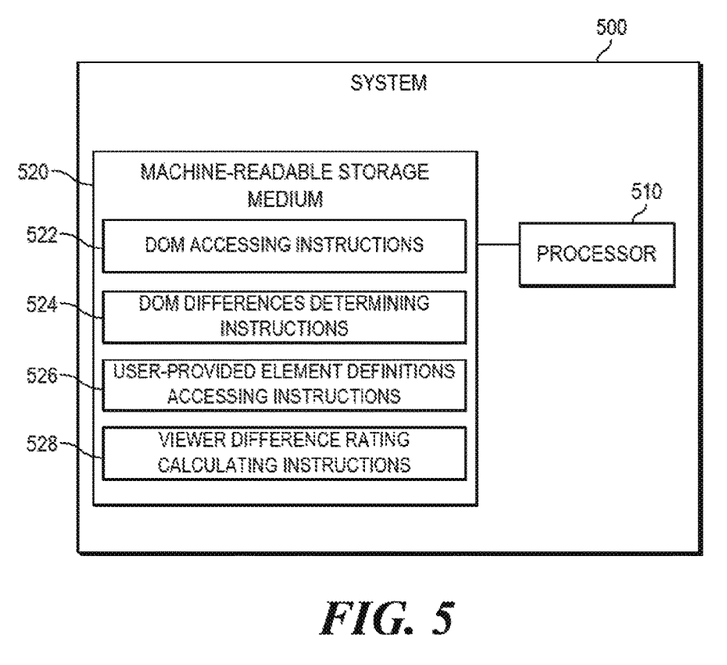
FIG. 5 is a block diagram of an example system for measuring compatibility of viewers by leveraging user-provided element definitions.
Figure 6:
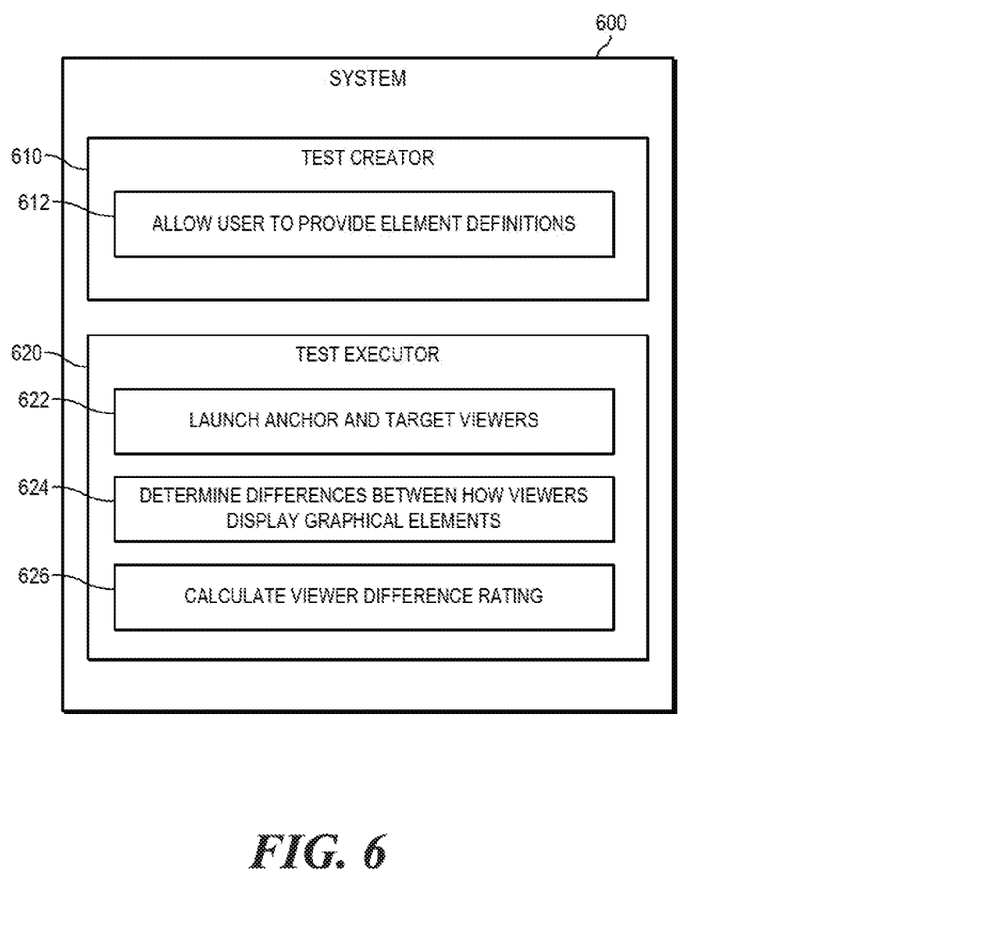
FIG. 6 is a block diagram of an example system for measuring compatibility of viewers by leveraging user-provided element definitions.

FIG. 5 is a block diagram of an example system 500 for measuring compatibility of viewers by leveraging user-provided element definitions. System 500 may be similar to system 100 of FIG. 1 and/or system 600 of FIG. 6. In the embodiment of FIG. 6, system 500 includes a processor 510 and a machine-readable storage medium 520. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed across (e.g., executed by) multiple processors.

Processor 510 may be one or more central processing units (CPUs), microprocessors, and/or other hardware devices suitable for retrieval and execution of instructions stored in machine-readable storage medium 520. In the particular embodiment shown in FIG. 5, processor 510 may fetch, decode, and execute instructions 522, 524, 526, 528 to measure compatibility of viewers. As an alternative or in addition to retrieving and executing instructions, processor 510 may include one or more electronic circuits comprising a number of electronic components for performing the functionality of one or more of the instructions in machine-readable storage medium 520. With respect to the executable Instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for measuring compatibility of viewers by leveraging user-provided element definitions.

Referring to FIG. 5, DOM accessing instructions 522, when executed by a processor (e.g., 510), may cause system 500 to access a first document object model (DOM) generated by an anchor document viewer and a second DOM generated by a target document viewer. Each DOM may be generated in response to rendering document code. For each of multiple graphical elements displayable by the document viewers, each DOM may include a corresponding DOM element. DOM differences determining instructions 524, when executed by a processor (e.g., 510), may cause system 500 to determine differences between corresponding DOM elements of the first DOM and the second DOM. User-provided element definitions accessing instructions 526, when executed by a processor (e.g., 510), may cause system 500 to access element definitions that Indicate how important particular differences are with respect to various DOM elements. The element definitions may be user-provided. Viewer difference rating calculating instructions 528, when executed by a processor (e.g., 510), may cause system 500 to calculate a viewer difference rating that is a quantifiable measurement of how similarly the target document viewer renders the document code with respect to the anchor document viewer.

FIG. 6 is a block diagram of an example system 600 for measuring compatibility of viewers by leveraging user-provided element definitions. System 600 may be similar to system 100 of FIG. 1 and/or system 500 of FIG. 5. In the embodiment of FIG. 6, system 600 includes a test creator 610 and a text executor 620. Test creator 610 may, concurrent with creating a test for a webpage or application, allow a user to provide element definitions for graphical elements that are displayable on user interface (UI) pages of the webpage or application (see functionality at label 612). Each element definition may indicate how important it is that the particular graphical element displays in a particular manner. Test creator 610 may be implemented in the form of executable instructions stored on at least one machine-readable storage medium of system 600 and executed by at least one processor of system 600. Alternatively or in addition, test creator 610 may be implemented in the form of one or more hardware devices including electronic circuitry for implementing the functionality of test creator 610.

Test executor 620 may launch the webpage or application in an anchor viewer and a target viewer and execute the test with respect to each viewer (see functionality at label 622). Test executor 620 may also determine differences between how the anchor viewer and the target viewer display various graphical elements of the webpage or application (see functionality at label 624). Test executor 620 may also calculate a viewer difference rating that is a quantifiable measurement of how important the differences are, wherein the calculation includes accessing the element definitions (see functionality at label 626).

The invention claimed is:

1. A method for measuring compatibility of viewers, the method comprising:
   accessing a document object model (DOM) generated by an anchor document viewer in response to rendering document code, wherein the DOM includes multiple DOM elements that correspond to graphical elements displayable by the anchor document viewer;
   for each of at least one of the multiple DOM elements, allowing a user to provide an element definition that indicates how important it is that the corresponding graphical element displays as it does in the anchor document viewer,
      wherein allowing a user to provide an element definition comprises providing a graphical user interface (GUI) that allows the user to activate a menu related to the corresponding graphical element, wherein the menu allows the user to set or select an importance rating and multiple properties for the element definition of the corresponding graphical element;
   determining rendering differences, utilizing the importance rating and the multiple properties, between the anchor document viewer and a target document viewer, including comparing rendering of a DOM element in the anchor document viewer and a corresponding DOM element in the target document viewer to determine an element difference rating;
   determining a weight value to designate an importance level for the rendering differences; and
   calculating a viewer difference rating utilizing the element difference rating to determine how similarly the target document viewer renders in comparison to the anchor document viewer.

2. The method of claim 1, wherein the importance rating for the element definition indicates the importance of an overall look and feel of the corresponding graphical element; and
   each of the multiple properties for the element definition indicates an importance of a certain aspect of the look and feel of the corresponding graphical element.

3. The method of claim 2, wherein each of the multiple properties has a value range and a weight, where each weight indicates how important it is that the corresponding aspect of the look and feel has a value within the corresponding value range.

4. The method of claim 1, further comprising saving the provided element definitions as part of a test file or in an elements definitions file that travels along with the test file.

5. The method of claim 1, wherein the allowing a user to provide an element definition occurs concurrently with the user creating a test to test functionality of the document code.

6. The method of claim 5, further comprising, concurrent with executing the test with respect to a replica anchor document viewer and a target document viewer:
   determining differences between a first DOM generated by the replica anchor document viewer and a second DOM generated by the target document viewer according to the element difference rating for the corresponding graphical element of each of the at least one of the multiple DOM elements.

7. The method of claim 1, wherein the anchor document viewer is an anchor web browser and wherein the document code is code for a webpage or web application.

8. A non-transitory machine-readable storage medium encoded with instructions for measuring compatibility of viewers, the instructions executable by a processor of a system to cause the system to:
   access a first document object model (DOM) generated by an anchor document viewer and a second DOM generated by a target document viewer, each DOM generated in response to rendering document code, wherein for each of multiple graphical elements displayable by the document viewers, each DOM includes a corresponding DOM element;
   access element definitions that indicate how important particular differences are with respect to various DOM elements, wherein the element definitions include an importance rating and multiple properties for each of the various DOM elements, and the importance rating and multiple properties are received via a graphical user interface (GUI) allowing a user to set or select the importance rating and the multiple properties;
   determine rendering differences, utilizing the importance rating and the multiple properties, between the anchor document viewer and a target document viewer, including comparing rendering of a DOM element in the anchor document viewer and a corresponding DOM element in the target document viewer to determine an element difference rating;
   determine a weight value to designate an importance level for the rendering differences; and
   calculate a viewer difference rating that is a quantifiable measurement of how similarly the target document viewer renders the document code with respect to the anchor document viewer.

9. The machine-readable storage medium of claim 8, wherein for each of the various DOM elements:
   the importance rating indicates an importance of an overall look and feel of a graphical element associated with the DOM element; and
   the multiple properties indicate the importance of certain aspects of the look and feel of the graphical element.

10. A system for measuring compatibility of viewers, the system comprising:
   a test creator to, concurrent with creating a test for a webpage or application, allow a user to provide element definitions for graphical elements that are displayable on user interface (UI) pages of the webpage or application, wherein each element definition indicates how important it is that the particular graphical element displays in a particular manner, wherein to allow a user to provide element definitions comprises providing a graphical user interface (GUI) that allows the user to activate a menu related to the particular graphical element, and the menu allows the user to set or select an importance rating and multiple properties for the element definition of the particular graphical element; and a test executor to:

launch the webpage or application in an anchor viewer and a target viewer and execute the test with respect to each viewer, determine differences between how the anchor viewer and the target viewer display the graphical elements of the webpage or application based on the element definitions, wherein to determine the differences comprises determining, for each graphical element, an element difference rating based on the importance rating and multiple properties for the element definition of the graphical element, determine a weight value to designate an importance level for the rendering differences, and calculate a viewer difference rating based on the element difference ratings for the graphical elements, wherein the viewer difference rating is a quantifiable measurement of how important the differences are.

11. The system of claim 10, wherein the test executor is further to generate a report for the target viewer and other target viewers, wherein the report provides the viewer difference rating for the target viewer and other viewer difference ratings for the other target viewers.

12. The system of claim 11, wherein the test executor is further to provide another GUI to allow the user to view the report and interact with the report to expand sections to see how each of the viewer difference ratings were calculated.

13. The method of claim 1, comprising:

determining an element difference rating based on the importance rating and multiple properties for the element definition of the corresponding graphical element; and determining a viewer difference rating based on the element difference rating determined for each of the at least one of the multiple DOM elements.

14. The machine-readable storage medium of claim 8, wherein the instructions executable by the processor cause the system to:

determine element difference ratings based on the importance ratings and the multiple properties in the element definitions of the various DOM elements; and calculate the viewer difference rating based on the element difference ratings for the various DOM elements.

* * * * *